March 2, 1965  P. H. BAUCHET  3,171,602
STATIC APPARATUS FOR SPRAYING LIQUIDS
Filed Sept. 21, 1962
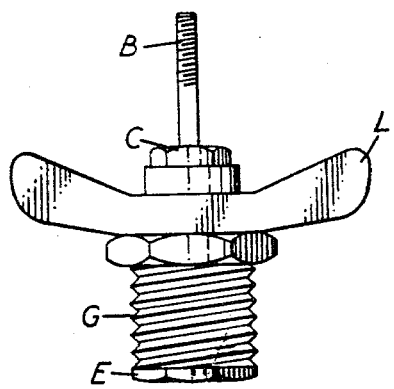
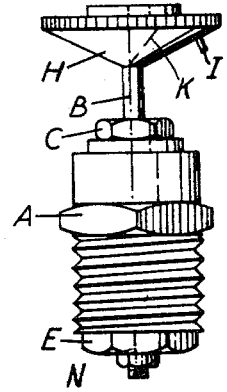
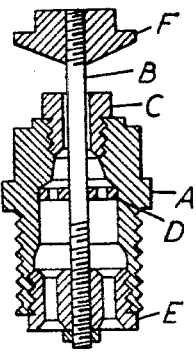
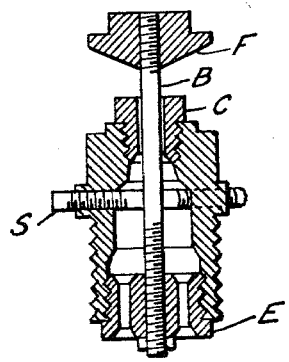
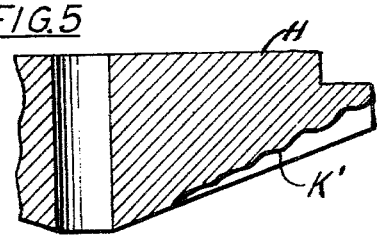
Inventor
Pierre Henry Bauchet
By Michael J. Striker
Attorney

3,171,602
STATIC APPARATUS FOR SPRAYING LIQUIDS
Pierre Henry Bauchet, 80 Rue des Martinets,
Casablanca, Morocco
Filed Sept. 21, 1962, Ser. No. 225,336
Claims priority, application France, Sept. 22, 1961,
873,941
1 Claim. (Cl. 239—515)

The principal object of this invention is to spray a liquid in fine droplets, evenly spread over a surface to be irrigated, without deformation of the shape of the rain curtain, which is usually influenced by the wind or by the uneven operation of the distributing mechanism. When the apparatus is intended for the irrigation of large surfaces, the aim is to treat the largest possible surface area with the same apparatus, with an initial water pressure as low as possible, and with a very small height of trajectory so as to reduce losses of water by evaporation. In all cases the ability to control the delivery of liquid and the shape of the rain curtain is desired and such control is obtained by mounting a spray cone in adjustable position above the end of the nozzle.

The apparatus of the present invention is illustrated by way of example in the drawing, in which:

FIG. 1 is a side view of one embodiment according to the present invention;

FIG. 2 is a side view of another embodiment;

FIG. 3 is a longitudinal section showing an embodiment similar to that of FIG. 2;

FIG. 4 is a section similar to FIG. 3; and

FIG. 5 is a partial cross section through a component of the apparatus shown in FIG. 2 and drawn to an enlarged scale.

The apparatus shown in various modifications in the drawing and described below aims to meet these requirements for irrigation by sprinkling, distribution of liquefied products and treatment of trees and other plantations. The apparatus is screwed on to the water inlet pipe, flush with the ground and perpendicular to the latter. The body G of the apparatus in FIGURE 1 has two lugs L and is provided with an outer screw thread permitting the screwing of this apparatus onto an upwardly extending correspondingly threaded end of a water pipe, not shown in the drawing.

The body A of the apparatus in FIGURE 2 and in FIGURE 3, has simply an external hexagonal shape for screwing the apparatus with a spanner into the threaded end of a water supply pipe.

At the bottom of bodies A and G, a cap E is internally screwed on and it receives, in its center, a threaded stem B which extends through the whole apparatus and projects upwardly therefrom and, which can be threadedly adjusted in longitudinal direction and be secured by a lock-nut N locked on cap E. A jet nozzle C is screwed on the top of the body. This jet nozzle C has a passage with a conical inlet for the entry of the liquid, at the bottom, and a cylindrical portion which has a length at least twice the hole diameter.

A washer D, in FIGURE 3, is fitted to the interior of the body immediately below jet C and assures the accurate centering of the stem B in the jet nozzle C.

When necessary the centering may be more accurately produced by means of three screws 5—only two of which are shown in FIG. 4 fixed to the body at the height of washer D, thus adjusting by tightening up or loosening any one of these three screws the concentricity of the jet nozzle C and stem B.

A spraying cone is screwed on to stem B, its angular portion being directed downwards. Cone H in FIGURE 2 is machined with grooves which are substantially tangential to a circle which approximately represents the diameter of stem B. The grooves are of square section and when the apparatus is intended for irrigation by sprinkling, the bottom faces K' of the grooves are slightly corrugated. These two arrangements make for an even distribution of the droplets both towards the center and periphery, the whole surface being thus treated.

Cone F in FIGURE 3 is machined without grooves and at a different apex angle.

The liquid passes through parts E and D in the body, which are bored with sufficient holes for this purpose, it is then accelerated in the jet nozzle C, continues its trajectory (being internally supported by stem B against the action of the wind), strikes the lower face of the spraying cone and expands over the latter which distributes it in form of a rain curtain towards the ground.

In order to obtain a different form of the rain curtain, two, three or four baffles I, in FIG. 2, are fixed perpendicular to the lower face of the spraying cone, causing a deflection of the rain curtain.

Baffles I of different diameter, height and position over the cone may be used according to the result sought.

All parts of the apparatus are exchangeable and adjustable to modify the results according to the area and amount of liquid to be distributed. A different jet hole will change the flow rate. A different angle of the spraying cone will change the height of the trajectory and modify the surface treated.

More or less numerous grooves in the cone surface will change the density of the spray.

A height of the spraying cone, more or less large relative to the jet, will modify the evenness of sprinkling at the centre with respect to the periphery of the irrigated area.

Summary

This diffuser has no moving mechanism susceptible of disturbing its operation.

The spraying is strictly concentrical and even over all the surface treated, and is not substantially influenced by the wind.

Pressure fluctuations will never modify the high efficiency of the apparatus and will produce a sprinkling closely approximating rain.

The adjustment of the apparatus permits to spray any liquid products in a low or high trajectory.

What is claimed is:

A sprinkler, comprising, in combination, an upright hollow body having a lower inlet and an upper outlet end and having a smaller transverse cross section than that inlet end; a plate extending transversely through said inlet end and being secured thereto, said plate being formed with a central threaded bore and a plurality of bores arranged about said central bore for the passage of liquid therethrough; a jet nozzle in said outlet end and being secured thereto, said nozzle being formed with an elongated central passage therethrough coaxial with said central bore in said plate and having a lower conical portion and an upper substantially cylindrical portion of a length at least twice the diameter thereof and extending up to the upper end of said nozzle; an elongated substantially cylindrical stem having a lower threaded end portion threadingly secured in said central bore of said plate and an upper portion having a smooth substantially cylindrical surface extending through and beyond said passage and defining between its outer surface and the inner surface of said jet nozzle an annular space of a transverse cross section considerably smaller than that of the annular space between the inner surface of said body and said cylindrical surface of said stem; a spray cone secured to the upper end of said stem and having a lower apex upwardly spaced from the upper end of said passage; and centering means comprising at least three screws angularly displaced from each other and extending transversely through said body and each engaging with an inner end thereof said stem beneath said nozzle for maintaining said stem substantially coaxially with said passage.

References Cited by the Examiner

UNITED STATES PATENTS

| | | | |
|---|---|---|---|
| 603,933 | 5/98 | Weeks | 239—514 X |
| 960,732 | 6/10 | Taylor | 239—514 |
| 1,724,662 | 8/29 | Johnson | 239—505 X |
| 1,913,278 | 6/33 | Ivey | |
| 2,446,918 | 8/48 | Goddard | 239—514 X |
| 2,564,060 | 8/51 | Gettins | 239—514 X |
| 2,935,266 | 5/60 | Coleondro et al. | |
| 2,949,241 | 8/60 | Slonim | |

FOREIGN PATENTS 605,667  2/26  France.

LOUIS J. DEMBO, *Primary Examiner.*

ROBERT A. O'LEARY, EVERETT W. KIRBY,
*Examiners.*